US012165244B2

(12) United States Patent
Rykhliuk et al.

(10) Patent No.: US 12,165,244 B2
(45) Date of Patent: *Dec. 10, 2024

(54) MACHINE LEARNING IN AUGMENTED REALITY CONTENT ITEMS

(71) Applicant: Snap Inc., Santa Monica, CA (US)

(72) Inventors: Olha Rykhliuk, Marina Del Rey, CA (US); Jonathan Solichin, Arcadia, CA (US); Aleksei Stoliar, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,400

(22) Filed: Oct. 26, 2022

(65) Prior Publication Data

US 2023/0120964 A1 Apr. 20, 2023

Related U.S. Application Data

(63) Continuation of application No. 16/946,413, filed on Jun. 19, 2020, now Pat. No. 11,521,339.

(Continued)

(51) Int. Cl.
*G06T 11/60* (2006.01)
*G06F 18/24* (2023.01)
(Continued)

(52) U.S. Cl.
CPC .............. *G06T 11/60* (2013.01); *G06F 18/24* (2023.01); *G06V 10/26* (2022.01); *G06V 10/462* (2022.01)

(58) Field of Classification Search
CPC ...... G06T 11/60; G06T 11/00; G06T 2210/16; G06T 19/006; G06F 18/24; G06V 10/26;
(Continued)

(56) References Cited

U.S. PATENT DOCUMENTS 9,980,100 B1 5/2018 Charlton et al.
10,096,122 B1 10/2018 Agrawal et al.
(Continued)

FOREIGN PATENT DOCUMENTS

CN 115917608 A 4/2023
EP 3657387 A1 5/2020
(Continued)

OTHER PUBLICATIONS

"U.S. Appl. No. 16/946,413, 312 Amendment filed Oct. 20, 2022", 7 pgs.
(Continued)

*Primary Examiner* — Maurice L. McDowell, Jr.
(74) *Attorney, Agent, or Firm* — Schwegman Lundberg & Woessner, P.A.

(57) ABSTRACT

Systems and methods herein describe receiving an image via an image capture device, using a machine learning model, generating an image augmentation decision, accessing an augmented reality content item, associating the generated image augmentation decision with the augmented reality content item, modifying the received image using the augmented reality content item and the associated image augmentation decision, and causing presentation of the modified image on a graphical user interface of a computing device.

20 Claims, 11 Drawing Sheets

Related U.S. Application Data

(60) Provisional application No. 63/037,518, filed on Jun. 10, 2020.

(51) Int. Cl.
 *G06V 10/26* (2022.01)
 *G06V 10/46* (2022.01)

(58) Field of Classification Search
 CPC .... G06V 10/462; G06V 10/764; G06N 3/126; G06N 20/00
 See application file for complete search history.

(56) References Cited

U.S. PATENT DOCUMENTS

| | | | |
|---|---|---|---|
| 10,133,950 | B2 | 11/2018 | Sweet, III |
| 10,572,988 | B1 | 2/2020 | Chaturvedi |
| 11,209,442 | B2 | 12/2021 | Winn et al. |
| 11,521,339 | B2 * | 12/2022 | Rykhliuk .............. G06N 3/126 |
| 2008/0174682 | A1 | 7/2008 | Faisman et al. |
| 2017/0109615 | A1 | 4/2017 | Yatziv et al. |
| 2017/0308770 | A1 | 10/2017 | Jetley et al. |
| 2018/0046882 | A1 * | 2/2018 | Carroll ............. G06F 18/24155 |
| 2018/0293439 | A1 | 10/2018 | Slesarev et al. |
| 2019/0069147 | A1 | 2/2019 | Charlton et al. |
| 2019/0171871 | A1 | 6/2019 | Zhang et al. |
| 2019/0259134 | A1 | 8/2019 | Rainy |
| 2019/0391578 | A1 | 12/2019 | Tariq et al. |
| 2020/0097005 | A1 | 3/2020 | Hirano et al. |
| 2020/0111261 | A1 | 4/2020 | Fang et al. |
| 2020/0117938 | A1 | 4/2020 | Greenberger et al. |
| 2020/0134298 | A1 | 4/2020 | Zavesky et al. |
| 2020/0160087 | A1 | 5/2020 | Redmon et al. |
| 2020/0234498 | A1 | 7/2020 | Price et al. |
| 2020/0250222 | A1 | 8/2020 | Javier et al. |
| 2021/0004962 | A1 | 1/2021 | Tsai et al. |
| 2021/0015240 | A1 * | 1/2021 | Elfakhri ................... G01J 3/46 |
| 2021/0015554 | A1 | 1/2021 | Chow et al. |
| 2021/0264673 | A1 * | 8/2021 | Jung .................... H04W 4/029 |
| 2021/0342306 | A1 * | 11/2021 | Fang .................... G06V 10/993 |
| 2021/0390745 | A1 | 12/2021 | Rykhliuk et al. |

FOREIGN PATENT DOCUMENTS

| | | |
|---|---|---|
| KR | 20130129458 A | 11/2013 |
| KR | 20200037602 A | 4/2020 |
| WO | WO-2021252386 A1 | 12/2021 |

OTHER PUBLICATIONS

"U.S. Appl. No. 16/946,413, Final Office Action mailed Sep. 14, 2021", 15 pgs.

"U.S. Appl. No. 16/946,413, Non Final Office Action mailed Feb. 14, 2022", 19 pgs.

"U.S. Appl. No. 16/946,413, Non Final Office Action mailed Apr. 13, 2021", 15 pgs.

"U.S. Appl. No. 16/946,413, Notice of Allowance mailed Jul. 20, 2022", 13 pgs.

"U.S. Appl. No. 16/946,413, Response filed Jan. 14, 2022 to Final Office Action mailed Sep. 14, 2021", 9 pgs.

"U.S. Appl. No. 16/946,413, Response filed Jun. 14, 2022 to Non Final Office Action mailed Feb. 14, 2022", 9 pgs.

"U.S. Appl. No. 16/946,413, Response filed Aug. 13, 2021 to Non Final Office Action mailed Apr. 13, 2021", 15 pgs.

"International Application Serial No. PCT/US2021/036238, International Search Report mailed Sep. 23, 2021", 4 pgs.

"International Application Serial No. PCT/US2021/036238, Written Opinion mailed Sep. 23, 2021", 7 pgs.

"U.S. Appl. No. 16/946,413, PTO Response to Rule 312 Communication mailed Nov. 1, 2022", 2 pgs.

"European Application Serial No. 21739826.2, Response filed Aug. 10, 2023 to Communication pursuant to Rules 161(1) and 162 EPC mailed Jan. 31, 2023", 22 pgs.

"International Application Serial No. PCT/US2021/036238, International Preliminary Report on Patentability mailed Dec. 22, 2022", 9 pgs.

"Korean Application Serial No. 10-2023-7000879, Notice of Preliminary Rejection mailed Feb. 15, 2024", w/ English Translation, 10 pgs.

"Korean Application Serial No. 10-2023-7000879, Response filed Apr. 15, 2024 to Notice of Preliminary Rejection mailed Feb. 15, 2024", W/ English Claims, 42 pgs.

* cited by examiner

MACHINE LEARNING IN AUGMENTED REALITY CONTENT ITEMS

CLAIM OF PRIORITY

This application is a continuation of and claims the benefit of priority of U.S. patent application Ser. No. 16/946,413, filed Jun. 19, 2020, which claims the benefit of priority to U.S. Patent Application Ser. No. 63/037,518, filed on Jun. 10, 2020, which are incorporated herein by reference in its entireties.

TECHNICAL FIELD

Embodiments of the present disclosure generally relate to machine learning. More particularly, but not by way of limitation, the present disclosure addresses systems and methods for using machine learning to provide decisions in augmented reality content items.

BACKGROUND

Image augmentations, such as filters, allow users to curate imaginative and expressive content. Such augmentations provide a creative tool for users to enhance the aesthetic of their content. Image augmentation capabilities are available through various social media tools. In many cases, users may provide user input to generate image augmentations.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

The disclosed examples relate to a custom augmentation system that uses machine learning to generate customized image augmentations. The custom augmentation system may be used within augmented reality content items (e.g., augmented reality experiences, filters) to provide the augmented reality content items with unique inputs. Using this technique, the custom augmentation system can provide augmented reality content items with customized input without receiving user input. Thus, the custom augmentation system uses machine learning models as a logic provider for augmented reality content items.

In some examples, the custom augmentation system receives an image via an image capture device. The custom augmentation system uses a machine learning model to generate an image augmentation decision. In some examples, the machine learning model is accessed from a resource library. The machine learning model may be a segmentation model, a classification model, an object detection model, or a saliency model. A segmentation model is a type of machine learning model that filters a portion of an image based on certain criteria. A classification model is a type of model that provides the probability that the input data is within a certain category. An object detection model provides a "bounding box" of where an object is in the camera. A saliency model predicts points of interest in an image.

The custom augmentation system generates the image augmentation decision based on the received image. The generated image augmentation decision may be used to create a more realistic image augmentation. In some examples, the generated image augmentation decision is used to provide more contextual information.

The custom augmentation system accesses an augmented reality content item. The augmented reality content item is configured to modify image content of the received image. The custom augmentation system associates the generated image augmentation decision with the augmented reality content. For example, the custom augmentation system provides the generated image augmentation decision as an input to the augmented reality content item. The custom augmentation system modifies the received image using the augmented reality content item and the associated image augmentation decision and causes presentation of the modified image on a graphical user interface of a computing device.

In some examples, the image augmentation decision is based on data received from device sensors of the computing device. For example, the image augmentation decision may be based on one or more of audio data, image data, location data, or the like. Further details regarding the custom augmentation system are described below.

Networked Computing Environment

Figure 1:
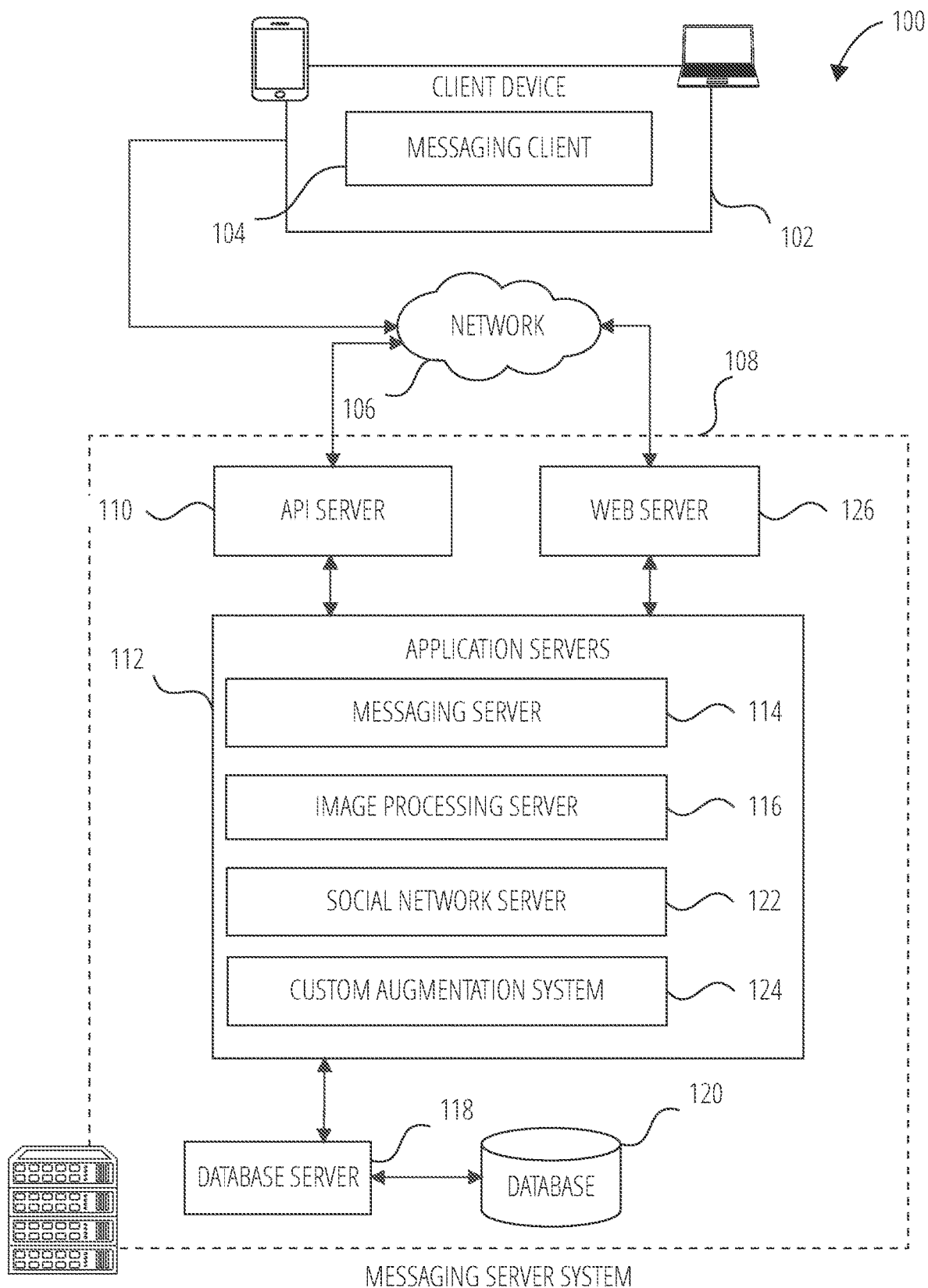
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104, where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to and provides a programmatic interface to application servers 112. The application servers 112 are communicatively coupled to a database server 118, which facilitates access to a database 120 that stores data associated with messages processed by the application servers 112. Similarly, a web server 126 is coupled to the application servers 112 and provides web-based interfaces to the application servers 112. To this end, the web server 126 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
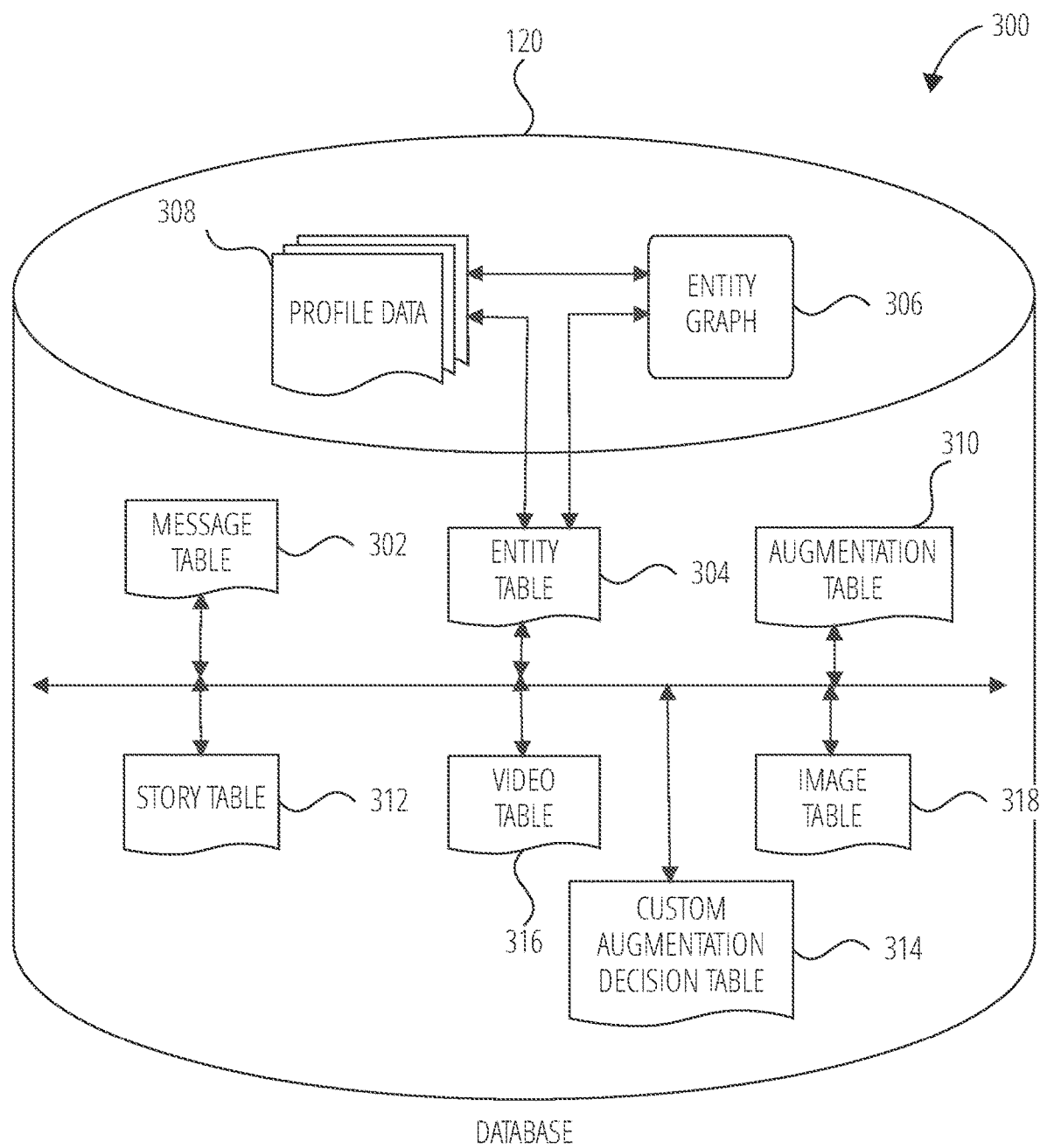
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

The custom augmentation system 124 generates customized image augmentations using machine learning models. The custom augmentation system 124 uses machine learning to generate an image augmentation decision and provides the image augmentation as input to an augmented reality content item.

System Architecture

Figure 2:
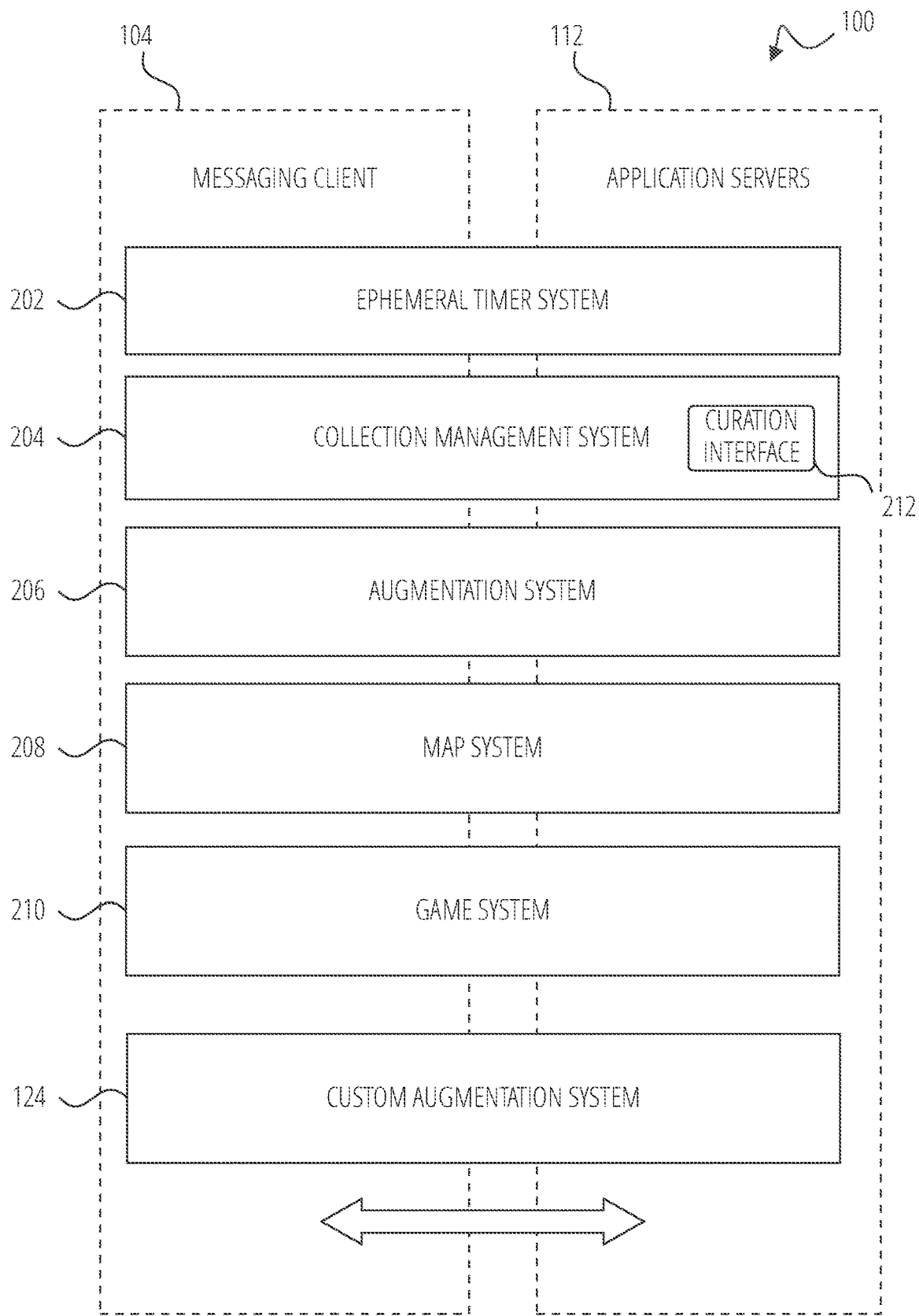
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, an augmentation system 206, a map system 208, a game system 210, and a custom augmentation system 124.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The custom augmentation system 124 generates customized image augmentations using machine learning models. The custom augmentation system 124 uses machine learning to generate an image augmentation decision and provides the image augmentation as input to an augmented reality content item. The augmented reality content item may be accessed from the augmentation system 206. In some examples, the custom augmentation system 124 operates within the context of the messaging client 104. In some examples, the custom augmentation system 124 may be supported by the application servers 112.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 316) and images (for which data is stored in an image table 318).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 318 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 316 stores video data that, in one example, is associated with messages for which records are maintained within the message table 302. Similarly, the image table 318 stores image data associated with messages for which message data is stored in the entity table 304. The entity table 304 may associate various augmentations from the augmentation table 310 with various images and videos stored in the image table 318 and the video table 316.

The database 120 can also store image augmentation decisions in the custom augmentation decision table 314.

Data Communications Architecture

Figure 4:
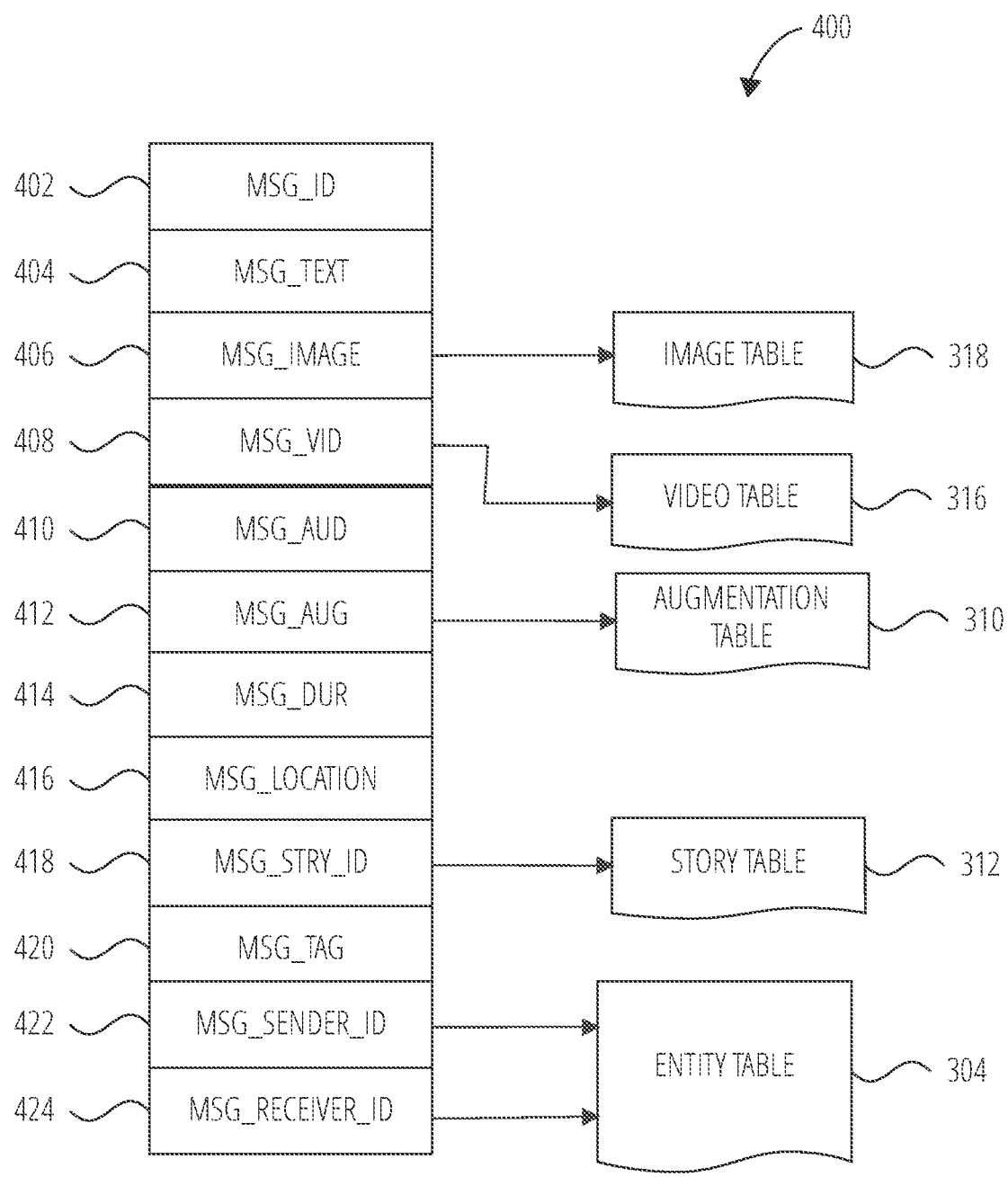
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 318.

message video payload 408: video data, captured by a camera component or retrieved from a memory component of the client device 102, and that is included in the message 400. Video data for a sent or received message 400 may be stored in the video table 316.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 318. Similarly, values within the message video payload 408 may point to data stored within a video table 316, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
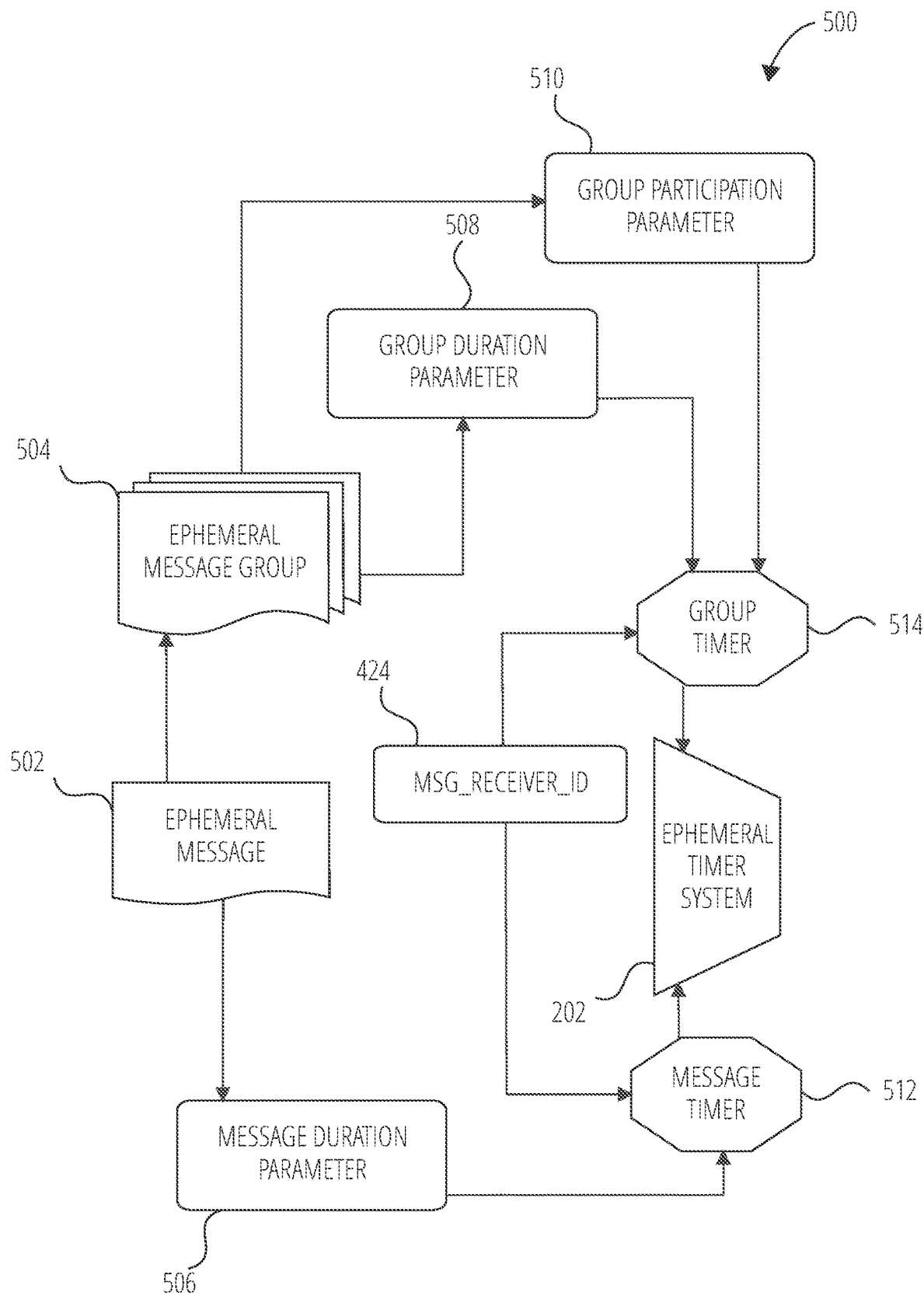
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
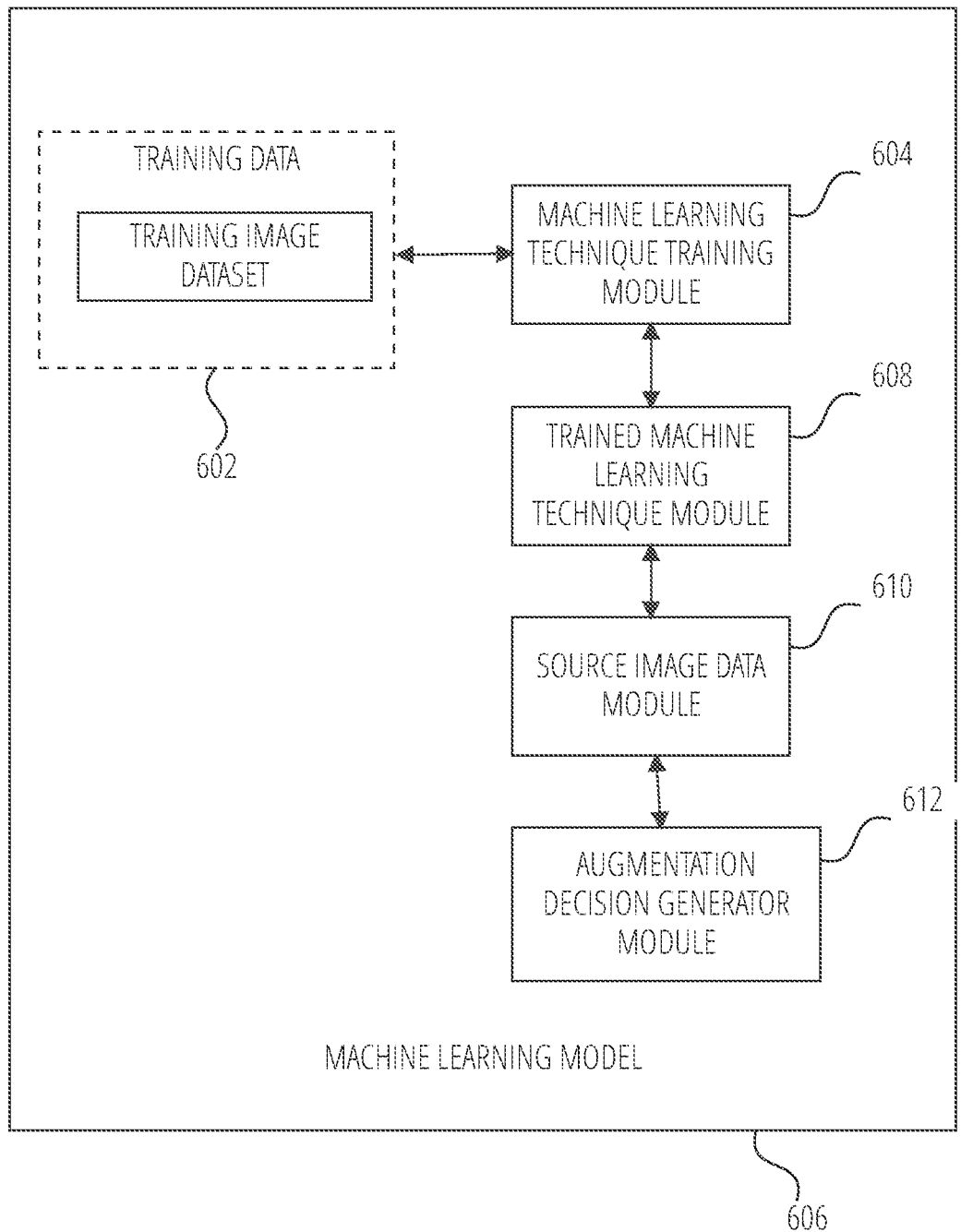
FIG. 6 is a diagrammatic representation of a machine learning model, in accordance with some example embodiments.

FIG. 6 illustrates a machine learning model 606, according to some examples. The machine learning model 606 includes training data 602, machine learning technique training module 604, a trained machine learning technique module 608, a source image data module 610, and augmentation decision generator module 612.

In some implementations, some modules of machine learning model 606 may be implemented on messaging client 104 and others may be implemented on application servers 112. In some implementations, all of the modules of machine learning model 606 are implemented on the messaging client 104 or the application servers 112. In such cases, the messaging client 104 communicates information to application servers 112 based on the modules implemented and vice versa.

The training data 602 includes training images and data for the machine learning model 606. For example, the training data 602 may include a human face dataset, a landscape dataset, an object dataset, and the like.

The machine learning technique training module 604 is trained to generate an image augmentation decision based on the received image.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., user login attempt features and known challenge response labels) in order to make data-driven predictions or decisions expressed as outputs or assessments. Although examples are presented with respect to a few machine-learning tools, the principles presented herein may be applied to other machine-learning tools. In some examples, different machine-learning tools may be used. For example, Logistic Regression (LR), Naive-Bayes, Random Forest (RF), neural networks (NN), matrix factorization, and Support Vector Machines (SVM) tools may be used for predicting a days to pending amount for a given property.

The machine-learning algorithms use features for analyzing the data to generate assessments. A feature is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

The machine-learning algorithms use the training data to find correlations among the identified features that affect the outcome or assessment. In some examples, the training data includes labeled data, which is known data for one or more identified features and one or more outcomes, such as the days to pending amount.

Once the training data are collaged and processed, the machine learning technique training module 604 can be built using machine learning techniques. Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model, and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some examples, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

In some examples, the machine learning technique training module 604 is trained to generate an image augmentation decision using the received image from the source image data module 610 based on one or more features (e.g., training data received from the training data 602). In some examples the custom augmentation system 124 may train the machine learning technique training module 604 on a periodic basis (e.g., weekly, monthly, annually).

After being trained, the machine learning technique training module 604 is provided to the trained machine learning technique module 608. The trained machine learning technique module 608 is configured to receive a source image from the source image data module 610. For example, the source image data module 610 receives a source image generated by the client device. The source image data module 610 instructs the trained machine learning technique module 608 to apply the trained machine learning technique to the source image provided by the source image data module 610.

The trained machine learning technique module 608, generates a decision using the source image provided by the source image data module 610. The type of decision that is generated by the trained machine learning technique module 608 may be configured by a user. In some examples, the trained machine learning technique module 608 is a classification machine learning model that provides a probability that the input source image from the source image data module 610 falls within a predefined category. In some examples, the trained machine learning technique module 608 is a segmentation machine learning model that filters a portion of the source image received from the source image data module 610 based on predefined criteria. In other examples, the trained machine learning technique module 608 is an object detection machine learning model that provides a bounding box of where an object is located in a source image. In some examples, the trained machine learning technique module 608 is a saliency model that predicts points of interest of a source image. The trained machine learning technique module 608 provides a generated decision to the augmentation decision generator module 612. The augmentation decision generator module 612 uses the generated decision and provides the generated decision as an input to an augmented reality content item for modifying the source image based on the generated decision and the augmented reality content item.

Figure 7:
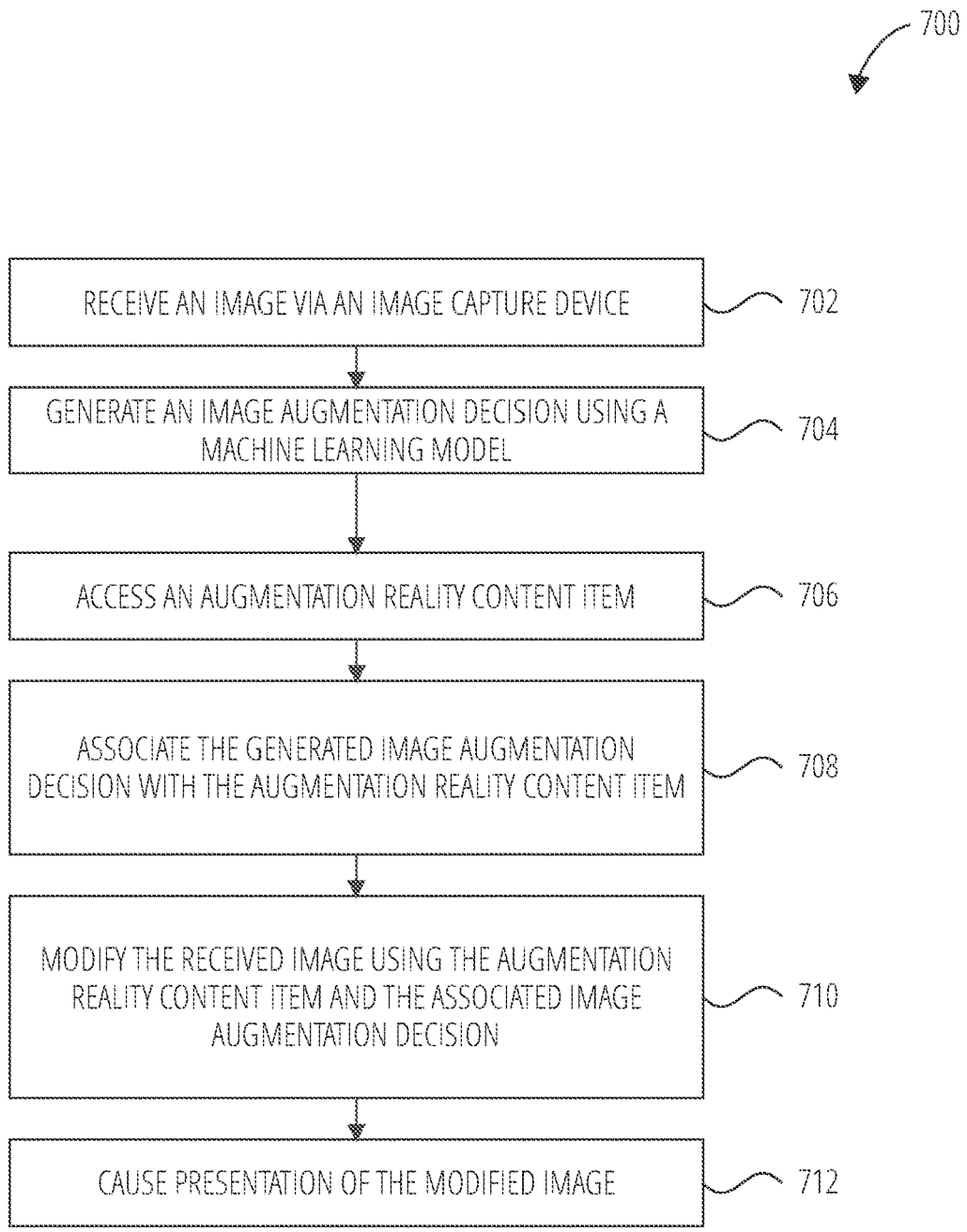
FIG. 7 is a flowchart of an example method for generating customized image augmentations, according to some example embodiments.

FIG. 7 is a flowchart of an example method 700 for generating a customized image augmentation, according to some examples. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

At operation 702, the custom augmentation system 124 receives an image via an image capture device. In some examples, the custom augmentation system 124 receives further data from the image capture device. For example, the further data may include audio data, image data, location data, or any other data available via device sensors coupled to the image capture device.

At operation 704, the custom augmentation system 124 generates an image augmentation decision using a machine learning model. The image augmentation decision is based on the received image. In some examples, the machine learning model is the machine learning model 606. In one example, the machine learning model 606 is used to decide whether a user has warm or cool skin tones. In another example, the machine learning model 606 is used to decide where a user is inside or outside. In some examples, the machine learning model 606 decides which object in an image is a primary object and which object is a secondary object. As discussed above, the type of decision made by the machine learning model 606 is based on the type of machine learning model used. For example, the machine learning model 606 may be a classification machine learning model, a segmentation machine learning model, an object detection machine learning model, or a saliency machine learning model. Any other type of suitable machine learning model may be used. In some examples, the machine learning model 606 is accessed from a resource library. The resource library may be communicatively coupled to the application servers 112 or messaging client 104.

At operation 706, the custom augmentation system 124 accesses an augmented reality content item. The augmented reality content item is configured to modify image content of the received image. The augmented reality content item may be accessed from the augmentation system 206. The augmented reality content item may be a real-time special effect and sound that may be added to an image or a video. For example, an augmented reality content item may be configured to change the color of an image. In some examples, the augmented reality content may provide an augmented reality experience by attaching an object to an image. Further details of the augmented reality content item are described above in connection with FIG. 3.

At operation 708, the custom augmentation system 124 associates the generated image augmentation decision with the augmented reality content item. The custom augmentation system 124 provides the generated augmentation decision as an input to the augmented reality content.

At operation 710, the custom augmentation system 124 modifies the received image using the augmented reality content item and the associated image augmentation decision. For example, the custom augmentation system 124 may include a machine learning model 606 that is trained to analyze the received image and generate a decision on whether a person in the image has a warm skin tone or a cool skin tone. The custom augmentation system 124 associates that image augmentation decision (e.g., whether person has a warm skin tone or a cool skin tone) with an augmented reality content item. For example, the augmented reality content item may be configured to apply virtual makeup to the person's face. When the custom augmentation system 124 associates the image augmentation decision with the augmented reality content item, the custom augmentation system 124 enhances the effect of the augmented reality content item by providing the image augmentation decision to the augmented reality content item. For example, if the image augmentation decision is that the person in the image has a warm skin tone, the augmented reality content item will apply virtual makeup using color shades that are best suited for people with warm skin tones. If the image augmentation decision is that the person in the image has a cool skin tone, the augmented reality content will apply virtual makeup using color shades that are best suited for people with cool skin tones. Thus, the modified image created at operation 710 is the result of a customized image augmentation based on the unique features of the person in the received image.

At operation 712, the custom augmentation system 124 causes presentation of the modified image on a graphical user interface of a computing device.

In some examples, the custom augmentation system 124 includes a saliency machine learning model (e.g., the machine learning model 606) that is trained to generate an image augmentation decision on which object in the received image is a "primary object" and which object is a "secondary object." For example, if an image has two people, the machine learning model 606 can decide which person is the primary subject and which person is the secondary subject. The image augmentation decision can be associated with an augmented reality content item that is configured to modify an image by applying virtual costumes on people in the image. The custom augmentation system 124 modifies the image using the image augmentation decision and the augmented reality content item. For example, the custom augmentation system 124 modifies the image by placing a virtual Batman costume on the primary subject and a virtual Robin costume on the secondary subject.

In some examples, the custom augmentation system 124 includes a classification machine learning model (e.g., the machine learning model 606) that is trained to generate an image augmentation decision on whether a person in the photo has long hair or short hair. The image augmentation decision can be associated with an augmented reality content item that is configured to modify an image by applying a hair color augmentation on the tips of the hair. However, a hair coloring augmented reality content item that applies hair coloring to a bottom area of a camera view to simulate hair coloring on the tips of long hair does not have the same effect on shorter hairs. Thus, the custom augmentation system 124 modifies the image using the image augmentation decision and the augmented reality content item to provide a more realistic hair coloring augmentation on the user based on whether the user in the image has short hair or long hair.

Figure 8:
FIG. 8 is a diagrammatic illustration of a modified image generated as a result of the custom augmentation system, according to some example embodiments.

FIG. 8 is a diagrammatic illustration 800 of a modified image generated as a result of the custom augmentation system 124, according to some examples.

For example, the custom augmentation system 124 may generate an image augmentation decision that determines whether or not a person in an image is inside or outside. The custom augmentation system 124 provides that image augmentation decision as an input to an augmented reality content item. The augmented reality content item may be configured to modify an image by placing a pair of virtual glasses over the person's eyes. By providing the image augmentation decision (e.g., whether the person is inside or outside) to the augmented reality content item, the custom augmentation system 124 may use the augmented reality content item to display virtual sunglasses or clear eyeglasses on the person. For example, if the image augmentation decision is that the person is outdoors, the custom augmentation system 124 will modify the image by placing virtual sunglasses on the person in the image. If the image augmentation decision is that the person is indoors, the custom augmentation system 124 will modify the image by placing clear eyeglasses on the person.

In another example, the custom augmentation system 124 may use a machine learning model 606 that is a classification machine learning model that is trained to generate an image augmentation decision as to whether a user is wearing glasses or not. The image augmentation decision may be used with a first augmented reality content item that is configured to generate virtual glasses to place over the user's eyes. If the image augmentation decision is that the user is not wearing glasses, the custom augmentation system 124 will use the first augmented reality content item and the associated image augmentation decision to place glasses over the user's eyes. However, if the image augmentation decision is that the user is wearing glasses, the custom augmentation system 124 will use the first augmented reality content item and the associated image augmentation decision to refrain from placing virtual glasses on the user, since placing virtual glasses on a user who is already wearing glasses, may disrupt the augmented reality experience.

In another example, the custom augmentation system 124 may use the image augmentation decision described above (e.g., whether a user is wearing glasses or not) in association with a second augmented reality content item that is configured to blur the graphical user interface of the computing device when a user takes off their glasses. For example, if the image augmentation decision is that the user is wearing glasses and subsequently removes their glasses, the custom augmentation system 124 will use the second augmented reality content item and the associated image augmentation decision to blur the graphical user interface of the computing device to suggest what would happen when a person with a visual impairment removes their glasses.

Figure 9:
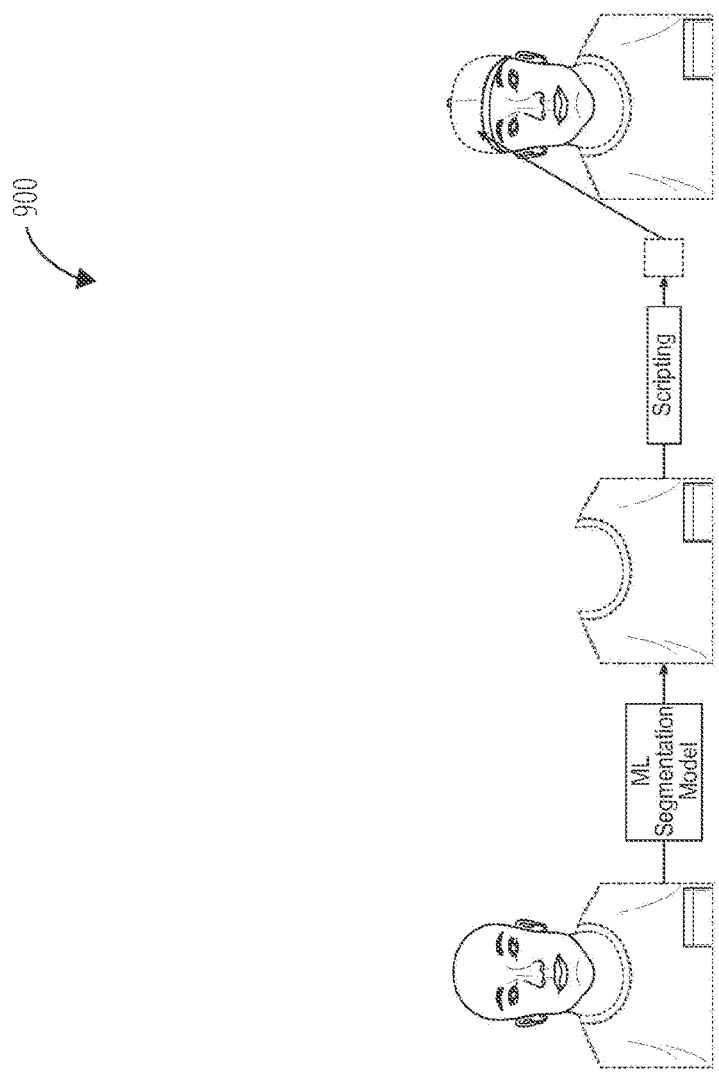
FIG. 9 is a diagrammatic illustration of a modified image generated as a result of the custom augmentation system, according to some example embodiments.

FIG. 9 is a diagrammatic illustration 900 of a modified image generated as a result of the custom augmentation system 124, according to some examples.

In some examples, the custom augmentation system 124 uses a machine learning model 606 that is a segmentation machine learning model. For example, the machine learning model 606 may be trained to extract the portion of the image containing the shirt. In one example, the custom augmentation system 124 may use a second non-machine learning system to determine the color of a shirt that a user is wearing in the image and determine commonly paired colors to use as the color for the hat. In some examples, the custom augmentation system 124 may use a second machine learning model to determine the color of a shirt that a user is wearing and determine commonly paired colors to use as the color for the hat.

For example, the image augmentation decision generated by the segmentation machine learning model may be that a certain portion of the image (e.g., specified pixel locations) includes the shirt. The image augmentation decision may be provided to another system (e.g., a second machine learning model or a non-machine learning model) that determines that the shirt is blue and that a commonly paired color with blue is also blue. The image augmentation decision (and the corresponding determination of the shirt color and commonly paired color) is then provided to an augmentation reality content item that is configured to place a virtual hat on a user within the image. In some examples, only the image augmentation decision is provided to the augmentation reality content item. In that example, the augmentation reality content item may be configured to determine the color of the shirt, determine a commonly paired color and place a virtual hat on a user within the image.

The custom augmentation system 124 uses the image augmentation decision and the augmentation reality content item to generate a modified image by placing a virtual hat on the user that matches (or is commonly paired with) the color of the user's shirt.

In some examples, the supplemental systems (e.g., second non-machine learning system or the second machine learning model) can determine pattern or texture data from the portion of the image that was extracted by the segmentation machine learning model. For example, the supplemental system may determine that the shirt has a blue plaid pattern and would thus generate a white paisley pattern for the virtual hat.

Machine Architecture

Figure 10:
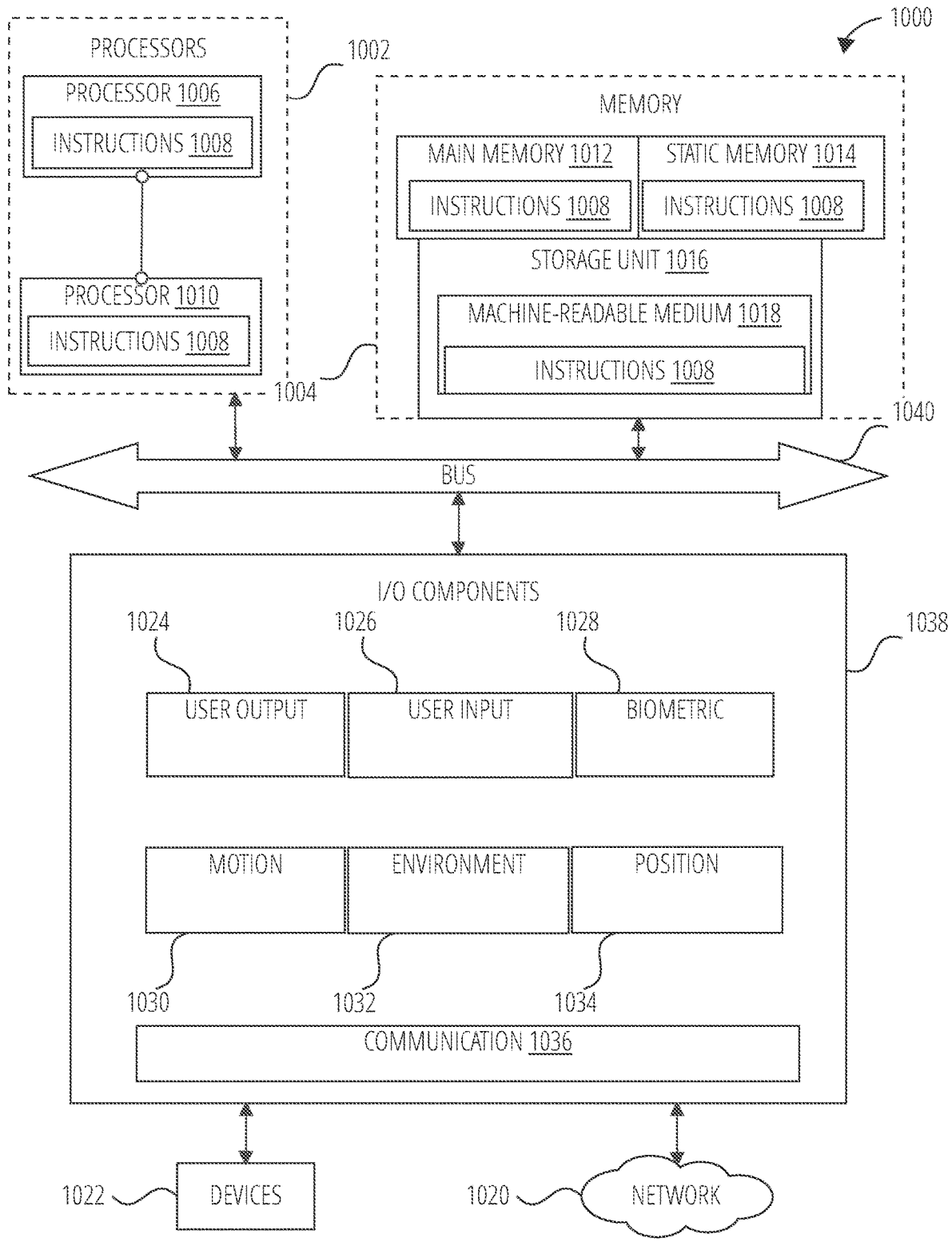
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output I/O components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1040. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the Processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface Component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
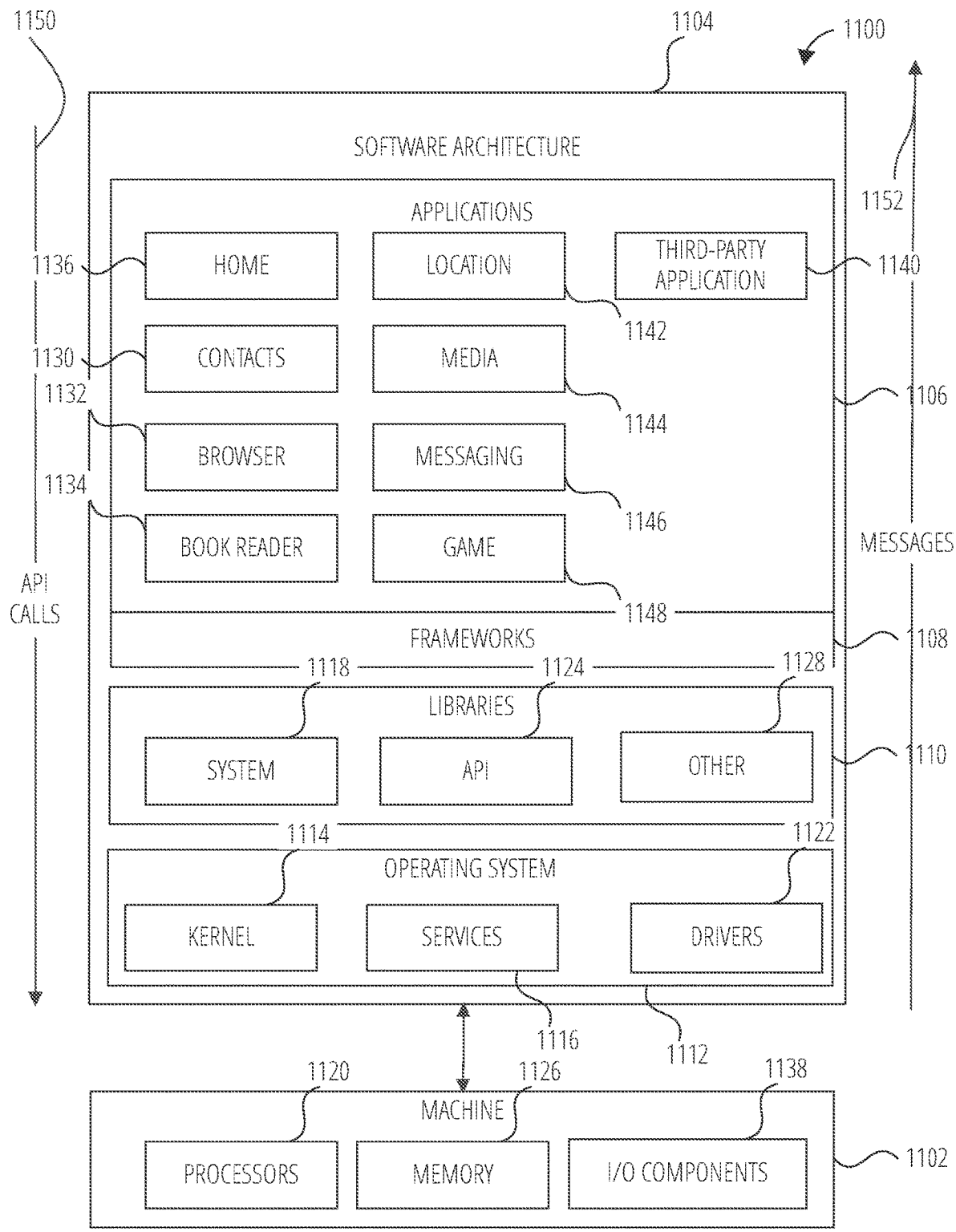
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D)

and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    receiving, using one or more processors, an image via an image capture device;
    using a first machine learning model comprising a first model type, generating an image augmentation decision, the image augmentation decision based on the received image and non-image data received from one or more sensors of the image capture device;
    using a second machine learning model comprising a second model type, generating a supplemental image augmentation decision, the supplemental augmentation decision based on the image augmentation decision, the second model type different than the first model type;
    accessing an augmented reality experience based on the image augmentation decision and the supplemental augmentation decision; and modifying the image using the augmented reality experience, the image augmentation decision, and the supplemental augmentation decision.

2. The method of claim 1, wherein the non-image data comprises one or more of location data and audio data.

3. The method of claim 1, further comprising:
providing the generated image augmentation decision as an input to the augmented reality experience.

4. The method of claim 1, wherein one or both of the first machine learning model and the second machine learning model is accessed from a resource library.

5. The method of claim 1, wherein the first model type and the second model type comprise one or more of:
a classification model that is configured to provide a probability of an input to be within a predefined category;
a segmentation model that is configured to filter a portion of the image based on predefined criteria; and
a saliency model that is configured to predict points of interests within the image.

6. The method of claim 1, wherein the first model type is a segmentation model that is configured to filter a portion of the image based on predefined criteria and the second model type is one of a classification model that is configured to provide a probability of an input to be within a predefined category and a saliency model that is configured to predict points of interests within the image.

7. The method of claim 1, wherein the first model type is a segmentation model that is configured to filter a portion of the image based on predefined criteria and the second machine learning model is configured to determine one or both of pattern and texture data of the portion filtered by the first machine learning model.

8. The method of claim 1, wherein the augmented reality experience is automatically accessed without user intervention.

9. The method of claim 1, wherein the augmented reality experience is an augmented reality content item that is configured to modify image content of the received image.

10. A system, the system comprising:
one or more processors; and
a memory storing instructions that, when executed by the one or more processors, cause the one or more processors to perform operations comprising:
receiving, using one or more processors, an image via an image capture device;
using a first machine learning model comprising a first model type, generating an image augmentation decision, the image augmentation decision based on the received image and non-image data received from one or more sensors of the image capture device;
using a second machine learning model comprising a second model type, generating a supplemental image augmentation decision, the supplemental augmentation decision based on the image augmentation decision, the second model type different than the first model type;
accessing an augmented reality experience based on the image augmentation decision and the supplemental augmentation decision; and
modifying the image using the augmented reality experience, the image augmentation decision, and the supplemental augmentation decision.

11. The system of claim 10, further comprising:
providing the generated image augmentation decision as an input to the augmented reality experience.

12. The system of claim 10, wherein one or both of the first machine learning model and the second machine learning model is accessed from a resource library.

13. The system of claim 10, wherein the first model type and the second model type comprise one or more of:
a classification model that is configured to provide a probability of an input to be within a predefined category;
a segmentation model that is configured to filter a portion of the image based on predefined criteria; and
a saliency model that is configured to predict points of interest within the image.

14. The system of claim 10, wherein the first model type is a segmentation model that is configured to filter a portion of the image based on predefined criteria and the second model type is one of a classification model that is configured to provide a probability of an input to be within a predefined category and a saliency model that is configured to predict points of interests within the image.

15. The system of claim 10, wherein the first model type is a segmentation model that is configured to filter a portion of the image based on predefined criteria and the second machine learning model is configured to determine one or both of pattern and texture data of the portion filtered by the first machine learning model.

16. A non-transitory computer-readable storage medium storing instructions that when executed by one or more processors of a machine, cause the computer-readable storage medium to perform operations comprising:
receiving, using one or more processors, an image via an image capture device;
using a first machine learning model comprising a first model type, generating an image augmentation decision, the image augmentation decision based on the received image and non-image data received from one or more sensors of the image capture device;
using a second machine learning model comprising a second model type, generating a supplemental image augmentation decision, the supplemental augmentation decision based on the image augmentation decision, the second model type different than the first model type;
accessing an augmented reality experience based on the image augmentation decision and the supplemental augmentation decision; and
modifying the image using the augmented reality experience, the image augmentation decision, and the supplemental augmentation decision.

17. The computer-readable storage medium of claim 16, further comprising:
providing the generated image augmentation decision as an input to the augmented reality experience.

18. The computer-readable storage medium of claim 16, wherein one or both of the first machine learning model and the second machine learning model is accessed from a resource library.

19. The computer-readable storage medium of claim 16, wherein the first model type and the second model type comprise one or more of:
a classification model that is configured to provide a probability of an input to be within a predefined category;
a segmentation model that is configured to filter a portion of the image based on predefined criteria; and
a saliency model that is configured to predict points of interests within the image.

20. The computer-readable storage medium of claim 16, wherein the first model type is a segmentation model that is configured to filter a portion of the image based on predefined criteria and the second model type is one of a classification model that is configured to provide a probability of an input to be within a predefined category and a saliency model that is configured to predict points of interests within the image.

* * * * *